(12) United States Patent
Ikeno et al.

(10) Patent No.: US 7,486,321 B2
(45) Date of Patent: Feb. 3, 2009

(54) IMAGE SENSOR, IMAGE READING DEVICE, AND METHOD FOR SETTING RESOLUTION

(75) Inventors: Takahiro Ikeno, Owariasahi (JP); Tatsuya Sato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1019 days.

(21) Appl. No.: 10/805,343

(22) Filed: Mar. 22, 2004

(65) Prior Publication Data

US 2004/0190087 A1 Sep. 30, 2004

(30) Foreign Application Priority Data

Mar. 26, 2003 (JP) ............................... 2003-085866

(51) Int. Cl.
*H04N 3/14* (2006.01)
(52) U.S. Cl. ...................... 348/304; 348/294; 348/303; 348/305; 348/308; 348/332; 250/208.1
(58) Field of Classification Search .................. 348/96, 348/97, 98, 294, 302, 303, 304, 305, 308, 348/332; 250/208.1
See application file for complete search history.

(56) References Cited

U.S. PATENT DOCUMENTS

| | | | | |
|---|---|---|---|---|
| 5,262,871 A | * | 11/1993 | Wilder et al. ................ | 348/307 |
| 5,717,199 A | * | 2/1998 | Carbone et al. .......... | 250/208.1 |
| 5,818,526 A | * | 10/1998 | Nomoto ....................... | 348/302 |
| 5,995,800 A | | 11/1999 | Ahn | |
| 6,249,618 B1 | | 6/2001 | Hou | |
| 6,473,538 B2 | * | 10/2002 | Kozuka ........................ | 382/312 |
| 6,580,455 B1 | * | 6/2003 | Wang et al. .................. | 348/308 |
| 6,697,108 B1 | * | 2/2004 | Chen et al. ................... | 348/241 |
| 6,794,627 B2 | * | 9/2004 | Lyon et al. ................ | 250/208.1 |
| 6,888,568 B1 | * | 5/2005 | Neter ....................... | 348/222.1 |
| 2001/0030700 A1 | * | 10/2001 | Mabuchi et al. ............. | 348/302 |
| 2002/0135827 A1 | * | 9/2002 | Saika .......................... | 358/513 |
| 2002/0145669 A1 | * | 10/2002 | Umeda et al. ............. | 348/220.1 |
| 2002/0186312 A1 | * | 12/2002 | Stark .......................... | 348/302 |
| 2004/0169752 A1 | * | 9/2004 | Stark .......................... | 348/302 |

FOREIGN PATENT DOCUMENTS

| | | |
|---|---|---|
| CN | 1175712 A | 3/1998 |
| CN | 1258040 A | 6/2000 |
| JP | A 5-227362 | 9/1993 |
| JP | A 2002-185698 | 6/2002 |
| JP | A-2002-185698 | 6/2002 |

* cited by examiner

*Primary Examiner*—Lin Ye
*Assistant Examiner*—Chriss S Yoder, III
(74) *Attorney, Agent, or Firm*—Oliff & Berridge, PLC

(57) ABSTRACT

An image sensor includes a plurality of photoelectric converting elements, each of which is provided with an electric charge output port, and a group of channel selection switches that turn on and off between the electric charge output port and a common signal line. A resolution of the image sensor is determined by ON-OFF patterns of a signal used for designating a resolution, at a timing of a rising or falling edge of a signal for setting a timing for designating the resolution during the period that a signal for setting a period for designating the resolution is on.

18 Claims, 12 Drawing Sheets

FIG.8

| STB SIGNAL WAVEFORM | LATCH 39 | LATCH 41 | RESOLUTION SETTING DATA (dpi) |
|---|---|---|---|
| WAVEFORM 1 | 0 | 0 | 1200 |
| WAVEFORM 2 | 1 | 0 | 600 |
| WAVEFORM 3 | 0 | 1 | 400 |
| WAVEFORM 4 | 1 | 1 | 300 |

FIG.11

| SP SIGNAL WAVEFORM | LATCH 49 | LATCH 49 | LATCH 51 |
|---|---|---|---|
| WAVEFORM 1 | 0 | 0 | 0 |
| WAVEFORM 2 | 1 | 0 | 0 |
| WAVEFORM 3 | 0 | 1 | 0 |
| WAVEFORM 4 | 0 | 0 | 1 |
| WAVEFORM 5 | 1 | 1 | 0 |
| WAVEFORM 6 | 0 | 1 | 1 |
| WAVEFORM 7 | 1 | 0 | 1 |
| WAVEFORM 8 | 1 | 1 | 1 |

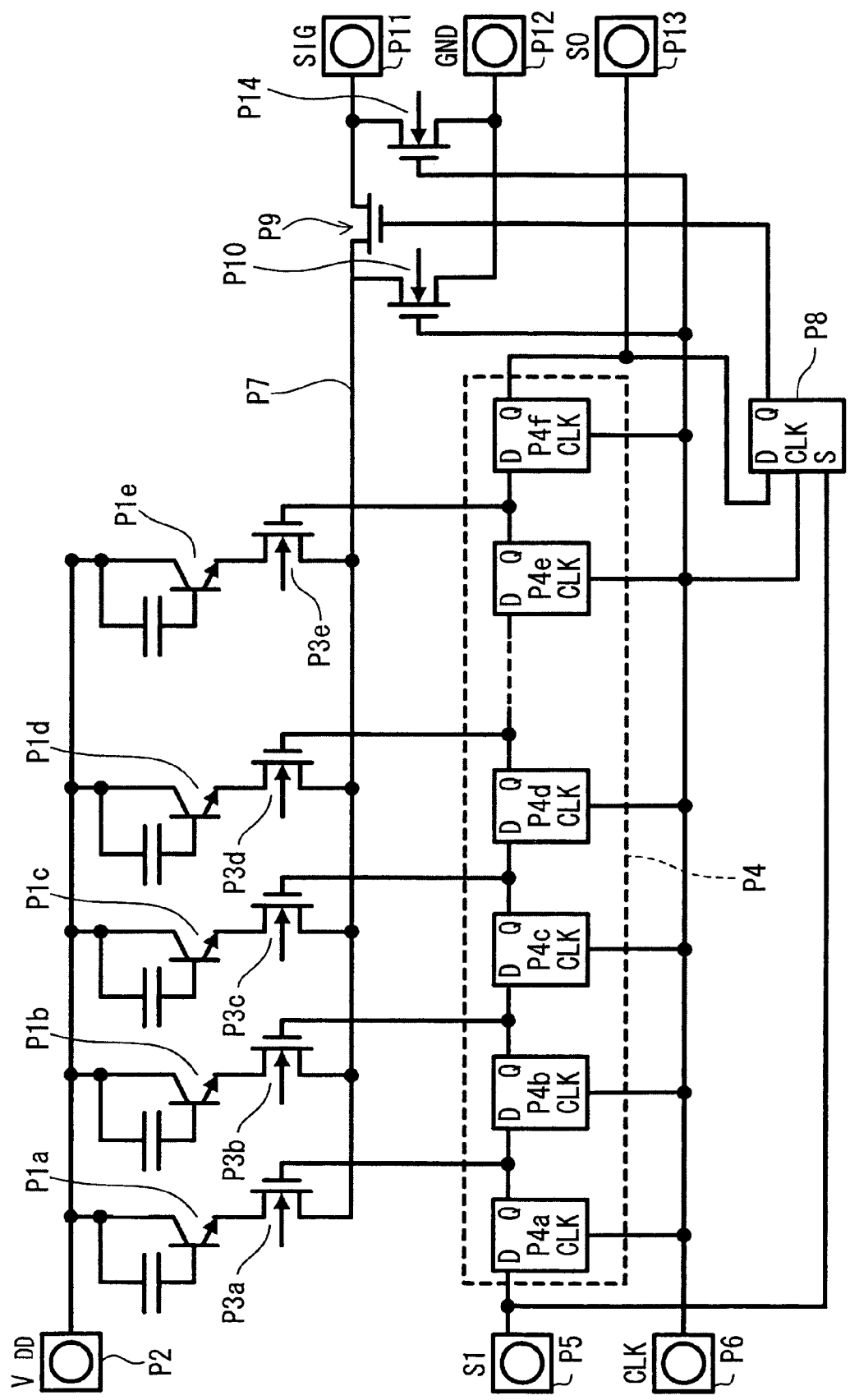

IMAGE SENSOR, IMAGE READING DEVICE, AND METHOD FOR SETTING RESOLUTION

BACKGROUND OF THE INVENTION

1. Field of Invention

The invention relates to an image sensor, an image reading device, and a method for setting resolutions.

2. Description of Related Art

An image sensor is used for known facsimile machines, copiers, and hand scanners provided with an image reading device. FIG. 12 shows a structure of a known image sensor. Photoelectric converting elements P1a-P1e, such as phototransistors, output current (image signals) upon the detection of light. A power input terminal P2 inputs power supply voltage VDD. Channel selection switches P3a-P3e are connected to electric charge output ports of the photoelectric converting elements P1a-P1e. A shift register group P4 includes shift registers P4a-P4f and is started by a start signal SI input to a start signal input terminal P5. The shift register group P4 performs on-off control for the channel selection switches P3a-P3e in synchronization with clock pulse signals (CLK) input to a clock pulse signal input terminal P6, to sequentially output the image signal from each photoelectric converting element P1a-P1e, to an image signal output terminal P11, through a common signal line P7.

During the operation of the shift register group P4 after the shift register group P4 is started by the start signal SI, more specifically, during the time until the start signal SI input to the shift register 4a, is output from the shift register P4f, a flip-flop P8 continuously outputs an ON-signal. A chip selection switch P9 is interposed in the signal line P7 and open upon the reception of the ON-signal. A switch 10 is connected between the signal line P7 and a ground terminal P12. The switch 10 repeatedly closes or opens, in accordance with changes in the levels of the clock pulse signal (CLK).

Operations of a known image sensor are described below. The start signal SI and clock pulse signal CLK are input through the start signal input terminal P5 and the clock pulse signal input terminal P6, respectively, to the shift register group P4. The cycle of the start signal SI is set in order to be twice as long as that of the clock pulse signal CLK. The start signal SI is input to the shift register P4a at the falling edge of the clock pulse signal CLK. Upon the reception of the start signal SI, the shift register P4a is started. The shift register P4a closes the channel selection switch P3a during a time of one cycle of the clock pulse signal CLK. Accordingly, the image signal that the photoelectric converting element P1a outputs, is output to the image signal output terminal P11, through the signal line P7. Thereafter, the channel selection switch P3a is open again and the start signal SI input to the shift register P4a is transferred to the shift register P4b.

Thus, the start signal SI is transferred to the shift registers P4b, P4c, P4d, P4e, in this order, so that the image signals from the photoelectric converting elements P1b-P1e are sequentially output to the image signal output terminal P11. The start signal SI is output, as a start signal for a sensor IC disposed downstream of the terminal P13 in a signal transmitting direction, from the shift register P4f, through a terminal P13.

For example, Japanese Laid-Open Patent Publication No. 5-227362 discloses an image sensor capable of setting two resolutions for image reading by selectively and switchingly outputting the current to an image signal output terminal from photocells or photoelectric converting elements using an externally input control signal.

SUMMARY OF THE INVENTION

In the resolution setting manner disclosed in the above-described publication, two resolutions are set based on the conditions of the control signal, whether it is in a HIGH or a LOW condition. However, more than two resolutions cannot be set in the above-described image sensor.

Accordingly, one exemplary aspect of the invention is to provide an image sensor, an image reading device, and a method for setting resolutions that is capable of setting multiple resolutions readily.

To achieve the above-described exemplary aspect, an image sensor may include a plurality of photoelectric converting elements that convert an optical signal to an electric signal, each of the photoelectric converting elements being provided with an electric charge output port, a common signal line that is connected to the electric charge output port of each of the photoelectric converting elements, a group of channel selection switches that are disposed between the common signal line and each of the photoelectric converting elements and that turns on and off between the electric charge output port and the common signal line, a resolution switching device that outputs a resolution switching signal according to a resolution to be set based on an instruction of a resolution setting, and a control signal generator that determines an ON-OFF control pattern of the group of channel selection switches, based on the resolution switching signal, and supplies a drive signal to the group of the channel selection switches, based on the determined pattern.

BRIEF DESCRIPTION OF THE DRAWINGS

Exemplary embodiments of the invention will be described in detail with reference to the following figures in which like elements are labeled with like numbers and in which:

FIG. 8 is a table showing a relation between a waveform of a STB signal and resolution setting data according to the first embodiment;

FIG. 11 is a table showing a relation between a waveform of a SP signal and latch conditions according to the invention; and FIG. 12 is a schematic illustration showing a structure of a known image sensor.

DETAILED DESCRIPTION OF PREFERRED EMBODIMENTS

Figure 1:
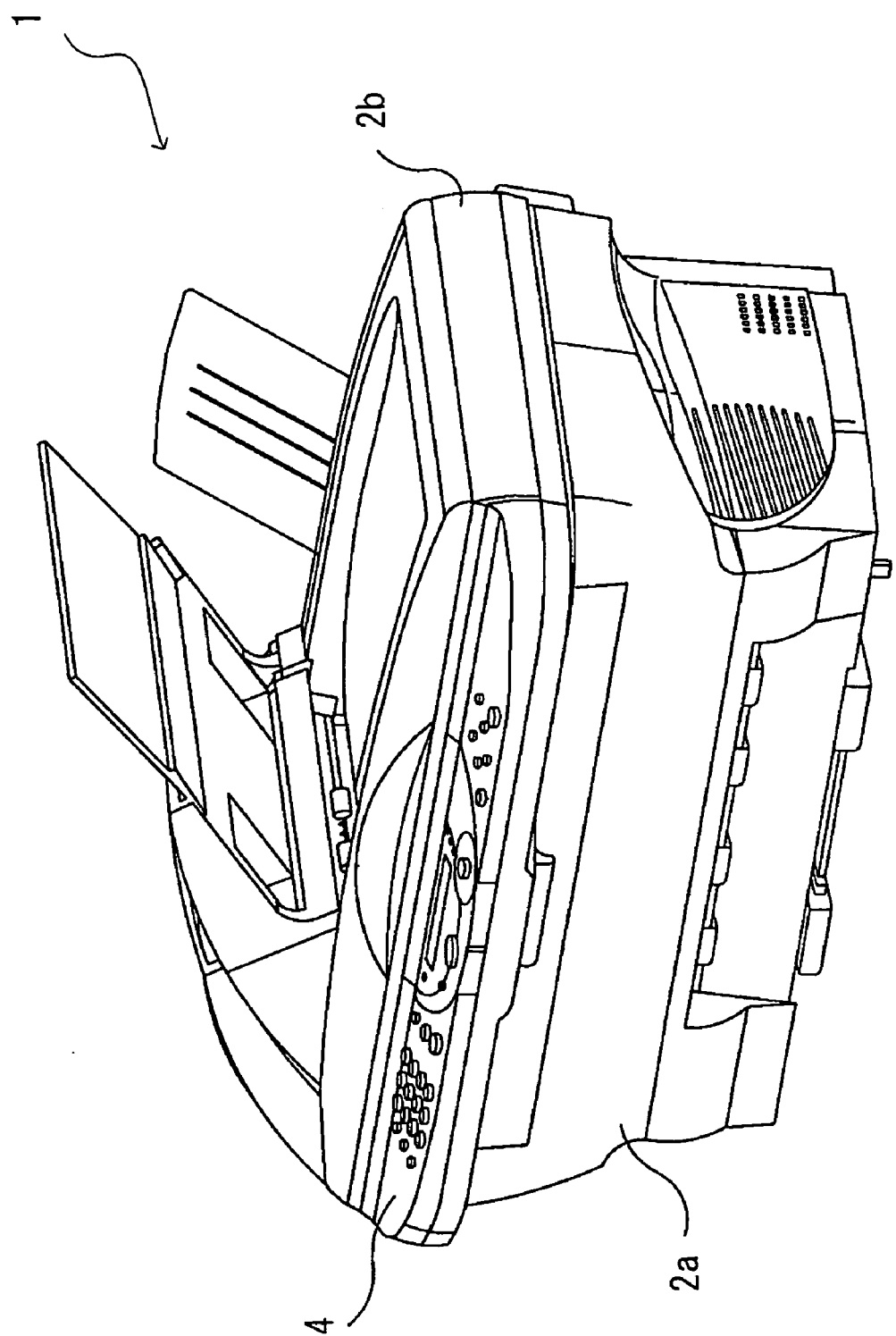
FIG. 1 is a perspective view of a multifunction device according to the invention.

An image sensor, an image reading device, and a method for setting resolutions according to embodiments of the invention will be described in detail with reference to the figures. A multifunction device including an image reading device 1 according to a first embodiment will be described with reference to FIGS. 1 and 2.

The multifunction device is a clam shell type that has an open and a closed structure. The multifunction device includes a lower body 2a and an upper body 2b. The image reading device 1 is provided in the upper body 2b. Provided on the upper body 2b on a front side of the multifunction device is a control panel 4. The multifunction device includes an image forming device, such as a laser printer, of which detailed description is omitted herein.

Figure 2:
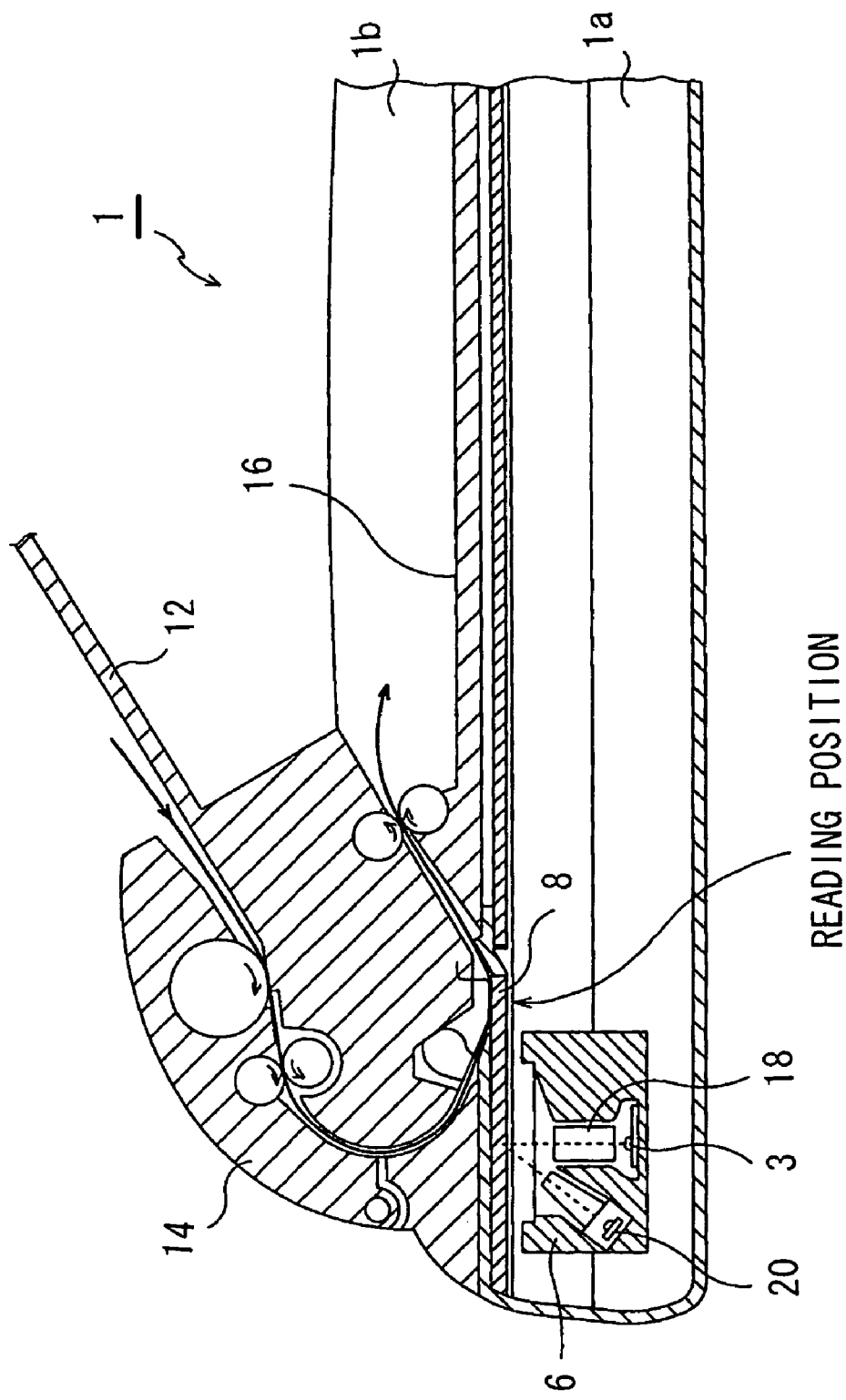
FIG. 2 is a cross-sectional view of an image reading device of the multifunction device.

As a document feeding mode, the image reading device 1 according to an embodiment includes flatbed (FB) and auto-document feeder (ADF) modes. The image reading device 1 includes, as shown in FIG. 2, a flatbed portion 1a and a cover portion 1b. The image reading device 1 is also a clam shell type that has an open and a close structure.

In the image reading device 1, as shown in FIG. 2, a reading head 6, and a first platen glass 8 are disposed in the flatbed portion 1a. A document tray 12, a document feeding device 14, and a document discharge tray 16 are disposed in the cover portion 1b.

The reading head 6 includes a photoreceptor 3, a SELFOC lens 18, and a light source 20. Light is applied from the light source 20 to a document that is in a reading position. The light reflected off the document is received by the SELFOC lens 18 to form an image on the photoreceptor 3. Thus, the illuminated image is captured by the photoreceptor 3. The reading head 6 is moved to the right and left sides in FIG. 2, by a drive mechanism (not shown). When an image on a document is read, the photoreceptor 3 is moved directly below a reading position.

Figure 3:
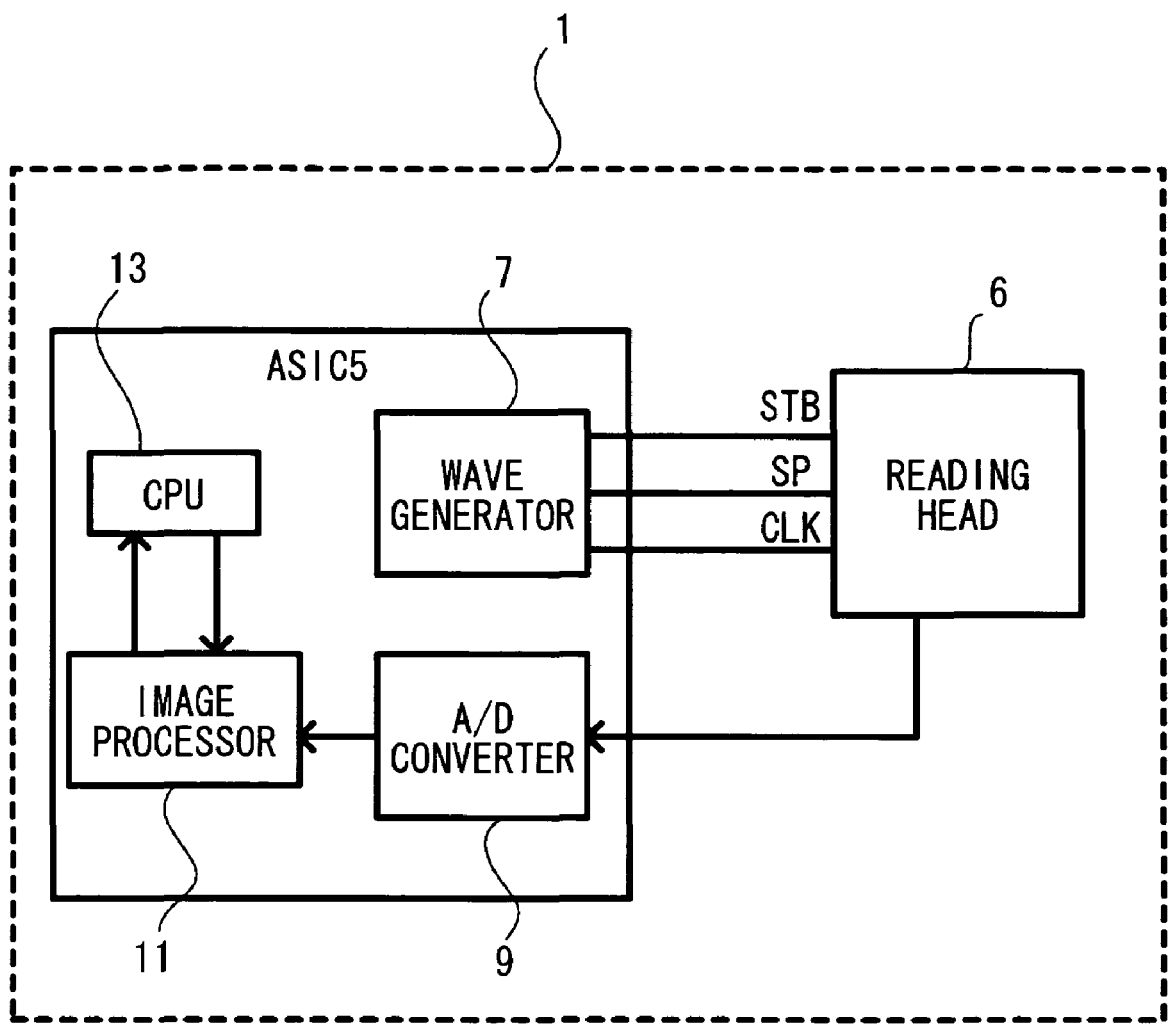
FIG. 3 is a schematic illustration of the image reading device of the multifunction device.

Referring to FIG. 3, structures of the image reading device 1 is described. The image reading device 1 includes the reading head (image sensor) 6 that reads an image and an ASIC (application-specific integrated circuit) 5 that controls the reading head 6 and processes image signals input from the reading head 6. The ASIC 5 includes a wave generator 7, an A/D (analog-to-digital) converter 9, an image processor 11, and a CPU (central processing unit) 13.

The wave generator 7 generates a strobe (STB) signal, a start pulse (SP) signal, and a clock pulse (CLK) signal. The wave generator 7 supplies those signals to the reading head 6. The A/D converter 9 converts an along image signal sent from the reading head 6 to a digital signal, which is output to the image processor 11. The CPU 13 performs the controls of the ASIC 5.

Figure 4:
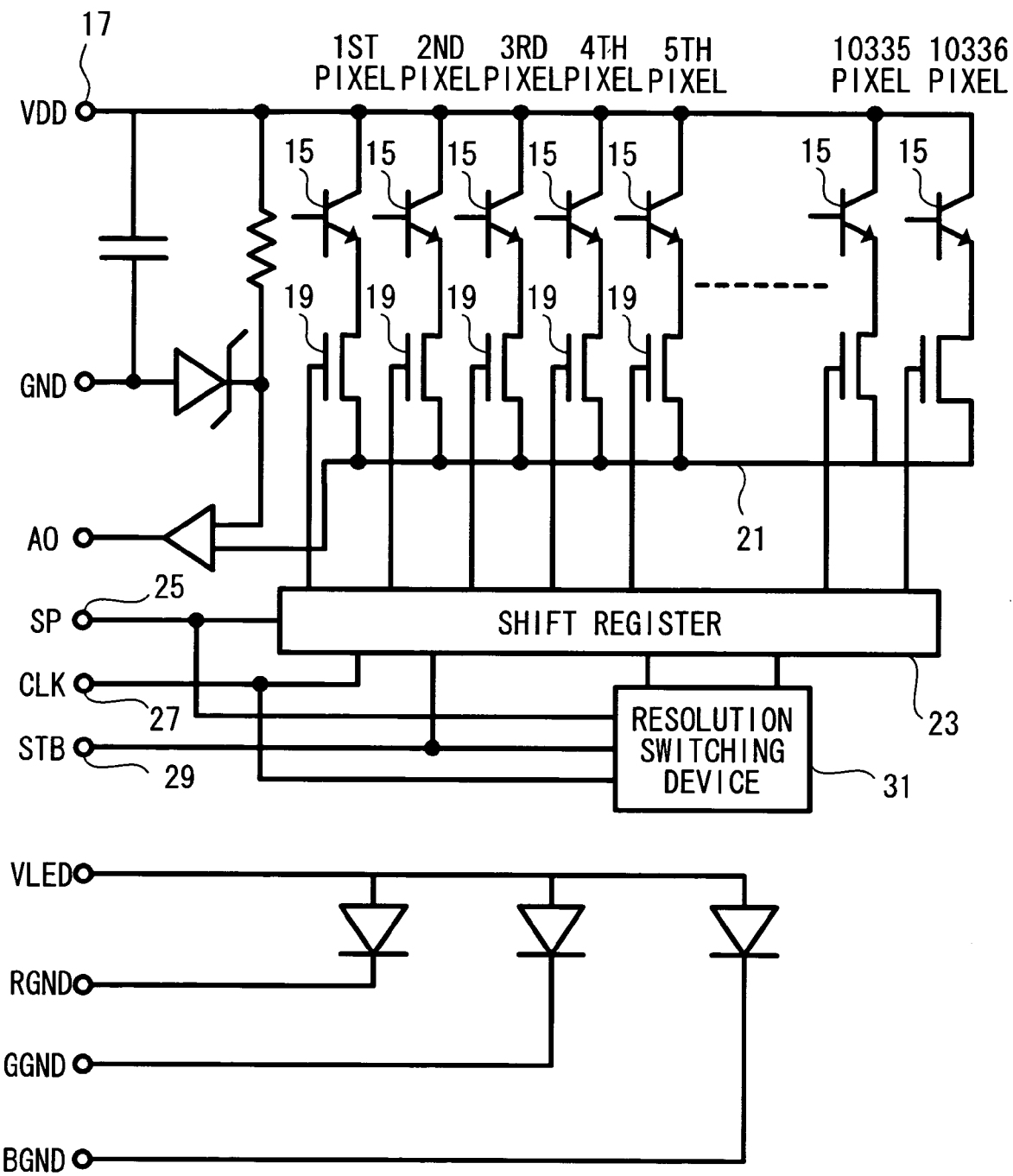
FIG. 4 is a circuit diagram showing a structure of a reading head of the image reading device.

Referring to FIGS. 3 and 4, structures of the reading head 6 will be described. As shown in FIG. 4, the reading head 6 includes photoelectric converting elements 15 that convert optical signals to electric signals. The photoelectric converting element 15 may be thin-film photo-diodes or may be formed of a photoconductive thin film. A total of 10336 photoelectric converting elements 15 are aligned in a row at a density associated with 1200 dpi. The photoelectric converting elements 15 are numbered in sequence from the 1st pixel to the 10336th pixel, as shown in FIG. 4. Each photoelectric converting element 15 is connected to a common electrode 17. A bias voltage VDD is applied to the photoelectric converting elements 15.

Analog switches (channel selection switches) 19 are disposed in association with the photoelectric converting elements 15. The analog switch 19 turns on and off between an output terminal (electric charge output port) of the photoelectric converting element 15 and an AO (analog output) terminal 21 of a signal output terminal.

A shift register 23 performs ON/OFF controls of the analog switches 19. The shift register 23 is started by the SP signal and sequentially outputs signals to gates of the analog switches 19 in synchronization with the CLK signals. The shift register 23 generates resolution setting data based on a signal sent from a resolution switching device 31. Based on the resolution setting data, an image is read at one of a designated four resolutions of 1200 dpi, 600 dpi, 400 dpi, and 300 dpi.

A SP terminal 25 is for inputting the SP signal, generated by the wave generator 7 of the ASIC 5, to the shift register 23 and the resolution switching device 31. A CLK terminal 27 is for inputting the CLK signal, generated by the wave generator 7 of the ASIC 5, to the shift register 23 and the resolution switching device 31. A STB terminal 29 is for inputting the STB signal, generated by the wave generator 7 of the ASIC 5, to the shift register 23 and the resolution switching device 31. The resolution switching device 31 sets the resolution of the reading head 6. The resolution switching device 31 also outputs to the shift register 23 a signal associated with one of the four resolutions of 1200 dpi, 600 dpi, 400 dpi, and 300 dpi.

As shown in FIG. 4, the reading head 6 also includes a ground potential GND, a voltage applied to the LED VLED, a red ground potential for red LEDs RGND, a green ground potential for green LEDs GGND and a blue ground potential for blue LEDs BGND.

Figure 5:
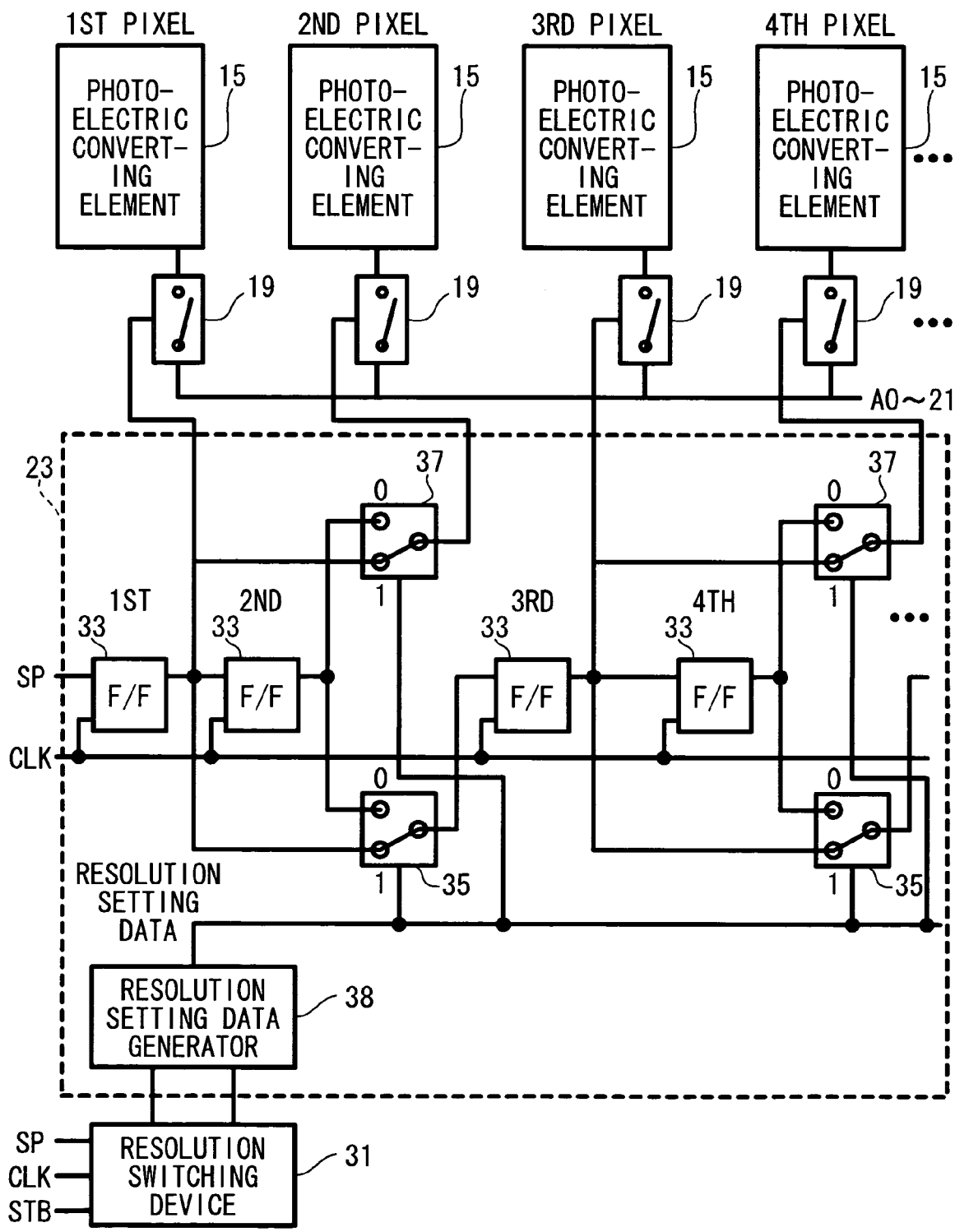
FIG. 5 is a circuit diagram showing a structure of a shift register of the reading head.

Referring to FIG. 5, structures of the shift register 23 will be described in detail below. The shift register 23 includes flip-flops (F/F) 33 provided in association with the photoelectric converting elements 15. The flip-flops 33 are numbered from 1 to 10336, similar to the photoelectric converting elements 15. The CLK signals are supplied to each of the flip-flops 33. The SP signal is supplied to the first flip-flop 33. Upon the input of the SP signal, each of the flip-flops 33 are activated and the analog switches 19 connected thereto are closed for a time of one cycle of the CLK signal. Selector switches 35 are provided in association with the even-numbered photoelectric converting elements 15. When resolution setting data associated with the 1200 dpi is received from a resolution setting data generator 38, which will be described below, the selector switches 35 are connected to terminal 0 thereof. At this time, the second flip-flop 33 is connected to the third flip-flop 33 and the fourth flip-flop 33 is connected to the fifth flip-flop 33. Similarly, the 2n-th flip-flop 33 is connected to the (2n+1)-th flip-flop 33, where n is an integer of 1 to 5167. The (2n−1)-th flip-flop 33 is always connected to the 2n-th fifth flip-flop 33. Therefore, all of the 1st to the 10336th flip-flops 33 are sequentially connected.

When resolution setting data associated with the 600 dpi is received from the resolution setting data generator 38, the selector switches 35 are connected to terminal 1 thereof. At this time, the (2n−1)-th flip-flop 33 is connected to the (2n+1)-th flip-flop 33, without being connected to the 2n-th flip-flop 33. In other words, the every other flip-flops 33, that is, 1st, 3rd, 5th . . . flip-flops 33 are connected.

Selector switches 37 are disposed in association with the even-numbered (2n) photoelectric converting elements 15. When the resolution setting data associated with the 1200 dpi is received from the resolution setting data generator 38, the selector switches 37 are connected to terminal 0 thereof. At this time, each of the even-numbered flip-flops 33, such as the 2nd, 4th, 6th . . . , and 10336th flip-flops 33, are connected to a gate of the associated analog switch 19, through the selector switches 37. Each of the odd-numbered flip-flops 33, such as the 1st, 3rd, 5th . . . , and 10335th flip-flops 33, are always connected to the associated analog switches 19. Therefore, each of the flip-flops 33 numbered from 1 to 10336 are connected to the gate of the associated analog switch 19.

When the resolution setting data associated with the 600 dpi is received from the resolution setting data generator 38, the selector switches 37 are connected to terminal 1 thereof. At this time, the 1st flip-flop 33 is connected to the gates of the 1st and 2nd analog switches 19. The 3rd flip-flop 33 is connected to the gates of the 3rd and 4th analog switches 19. In other words, the (2n−1)-th flip-flops 33 are connected to the gates of the (2n−1)-th and 2n-th analog switches 19. The even-numbered flip-flops 33 are not connected to any gates of the analog switches 19. As should be appreciated, the left side of the flip-flops 33, as shown in FIG. 5, is an input side and the right side of the flip-flops 33 is an output side.

In addition to the selector switch 35, the shift register 23 includes a selector switch (not shown) that connects every three flip-flops 33, such as 1st, 4th, 7th . . . flip-flops 33, in association with the resolution setting data associated with 400 dpi. Further, in addition to the selector switch 37, the shift register 23 includes a selector switch (not shown) that connects the (3m−2)th flip-flops 33 to the (3m−2)-th, (3m−1)-th and 3m-th analog switches 19, in association with the resolution setting data associated with 400 dpi, where m is an integer of 1 to 3445.

The shift register 23 includes a selector switch (not shown) that connects every four flip-flops 33, such as 1st, 5th, 9th . . . flip-flops 33, in association with the resolution setting data associated with 300 dpi. Further, the shift register 23 includes a selector switch (not shown) that connects the (4L−3)th flip-flops 33 to the (4L−2)-th, (4L−1)-th and 4L-th analog switches 19, in association with the resolution setting data associated with 300 dpi, where L is an integer of 1 to 2584.

Figure 6:
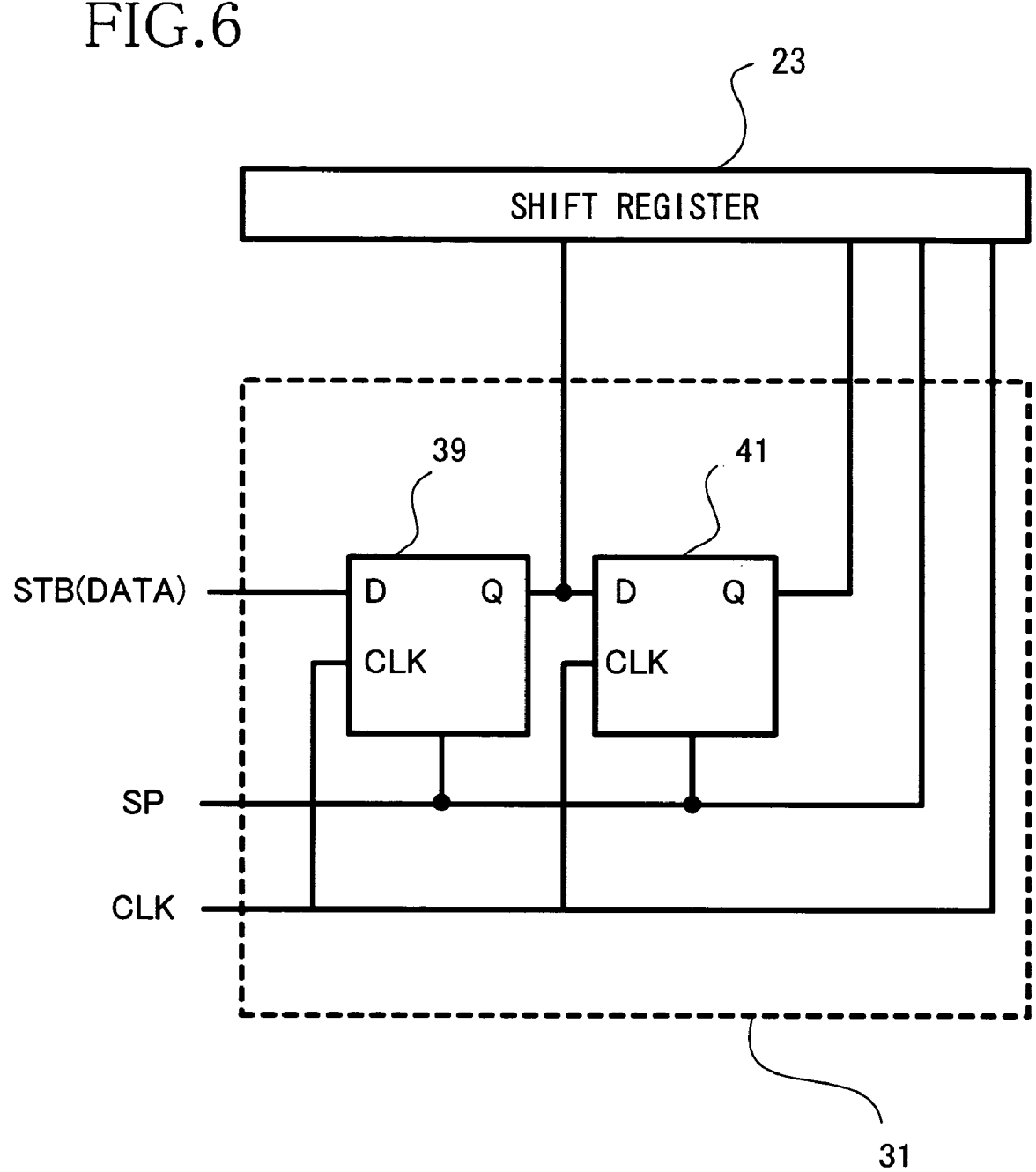
FIG. 6 is a circuit diagram showing a structure of a resolution switching device according to a first embodiment of the invention.

Referring to FIG. 6, the resolution switching device 31 will be described below. The resolution switching device 31 includes latches 39, 41. The latches 39, 41 input thereto the SP signal that is used as a signal for setting a period for designating a resolution, the CLK signal that is used as a signal for setting the timing for designating the resolution, and the STB signal that is used as a signal for designating the resolution.

Figure 7:
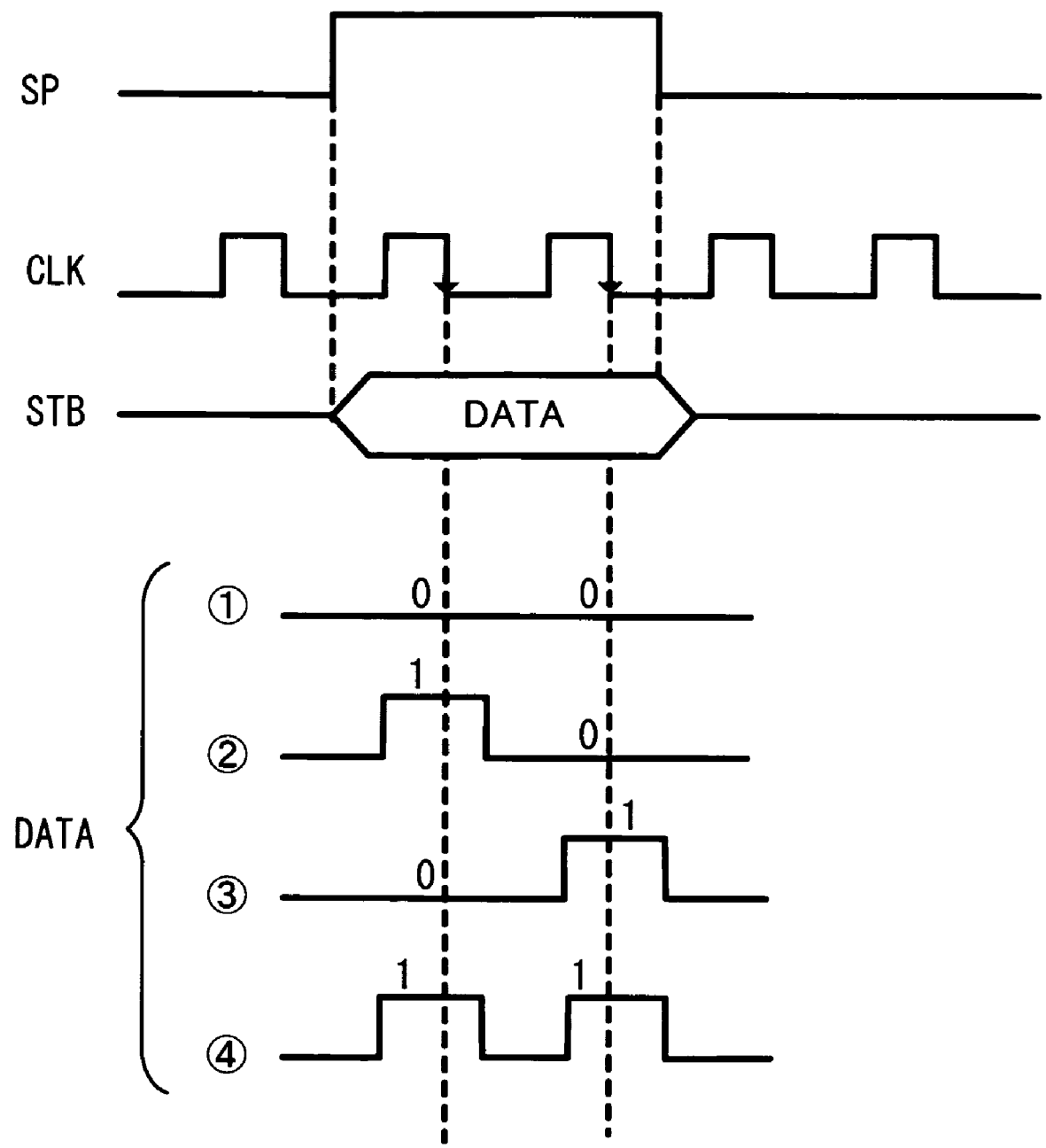
FIG. 7 is a schematic illustration showing waveforms of signals used for setting resolutions according to the first embodiment.

As shown in FIG. 7, the latch 39 latches DATA (output of the STB signal) at a timing of the first falling edge of the CLK signal during the period that the SP signal is on, as binary data. In other words, when DATA is on, "1" is latched. When DATA is off, "0" is latched. The data latched by the latch 39 is output to the resolution setting data generator 38 of the shift register 23, as shown in FIG. 5. The latch 41 latches DATA (output of the STB signal) at a timing of the second falling edge of the CLK signal during the period that the SP signal is on, as binary data. The data latched by the latch 41 is output to the resolution setting data generator 38 of the shift register 23.

Operations of the image reading device 1 will be described below. In the image reading device 1 according to the first embodiment, resolution is first set for the start of the image reading operation in the following manner. The wave generator 7, as shown in FIG. 3, generates the SP signal, CLK signal, and STB signal, based on the instruction from the CPU 13 and outputs those signals to the resolution switching device 31.

The waveform of the STB signal generated by the wave generator 7 will be any one of waveforms 1-4 shown in FIG. 7. When the waveform of the STB signal is the waveform 1, the STB signal is off at the timing of the first and second falling edges of the CLK signal during the period that the SP signal is on. At this time, each of the latches 39, 41 in the resolution switching device 31 latches "0".

When the waveform of the STB signal is the waveform 2, the STB signal is on and off at the timing of the first and second falling edges of the CLK signal, respectively, during the period that the SP signal is on. Therefore, the latches 39, 41 latch "1" and "0", respectively.

When the waveform of the STB signal is the waveform 3, the STB signal is off and on at the timing of the first and second falling edges of the CLK signal, respectively, during the period that the SP signal is on. Therefore, the latches 39, 41 latch "0" and "1", respectively.

When the waveform of the STB signal is the waveform 4, the STB signal is on at the timing of the first and second falling edges of the CLK signal during the period that the SP signal is on. Therefore, the latches 39, 41 latch "1".

As described above, the conditions of the latches 39, 41 in the resolution switching device 31 is one of the four conditions shown in the table of FIG. 8, based on the waveform of the STB signal generated by the wave generator 7.

The resolution setting data generator 38 of the shift register 23 is connected to the latches 39, 41. The resolution setting data generator 38 generates four types of resolution setting data, based on the conditions of the latches 39, 41. More specifically, when each of the latches 39, 41 latches "0", the resolution setting data generator 38 generates the resolution setting data associated with 1200 dpi. Similarly, when the latches 39, 41 latch "1" and "0", respectively, the resolution setting data generator 38 generates the resolution setting data associated with 600 dpi. When the latches 39, 41 latch "0" and "1", respectively, the resolution setting data generator 38 generates the resolution setting data associated with 400 dpi. When each of the latches 39, 41 latches "1", the resolution setting data generator 38 generates the resolution setting data associated with 300 dpi.

Accordingly, conditions of the latches 39, 41 in the resolution switching device 31 are determined from the above-described four combinations, based on the waveform of the STB signal generated by the wave generator 7. Based on the conditions of the latches 39, 41, the resolution setting data associated with the latch condition is determined from the four types. In the first embodiment, the resolution setting data associated with any one of the four resolutions is determined, based on the waveform of the STB signal.

The timing of latching is not limited to the falling edge of the CLK signal. The latches 39, 41 may latch DATA at the first and second rising edges of the STB signal, respectively. In addition, the STB signal, CLK signal, and SP signal may be interchanged for the latching. For example, the latch 39, 41 may latch the output of the SP signal at the timing of the falling edge of the CLK signal during the period that the STB signal is on.

As shown in FIG. 7, at the falling edge of the SP signal that is used for the resolution setting, the operation of the shift register 23 is started. Patterns of ON-OFF control for the analog switches 19 performed by the shift register 23 is determined based on the resolution setting data generated as described above. Consequently, the resolution of the image reading device 1 is determined.

The pattern of ON-OFF control for the analog switches 19 performed by the shift register 23 when the resolution setting data associated with 1200 dpi is generated will be described below, with reference to FIG. 5. As described above, when the selector switches 35 are connected to the terminal 0 thereof, the 1st to 10336th flip-flops 33 are all connected. When the selector switches 37 are connected to the terminal 0 thereof, the 1st to 10336th flip-flops 33 are connected to the gates of the associated analog switches 19.

As the SP signal is input to the first flip-flop 33, the first analog switch 19 is closed for a period of one cycle of the CLK signal. Thereafter, electric charge stored in the photoelectric converting elements 15 is sent to the AO terminal 21, as shown in FIG. 5. The SP signal input to the first flip-flop 33 is sequentially transmitted to the 2nd, 3rd, 4th, . . . and then to the 10336th flip-flop 33, in synchronization with the CLK signal. The flip-flops 33 that receive the SP signal close the associated analog switches 19 for a period of one cycle of the CLK signal. Accordingly, the 1st to 10336th photoelectric converting elements 15 sequentially release the electric charge stored therein to the AO terminal 21. The electric charge sent to the AO terminal 21 is transmitted, as an image signal, to the A/D converter 9 of the ASIC 5. As the 1st to 10336th photoelectric converting elements 15 release the electric charge, reading of the first line is finished. Thereafter, the 2nd and subsequent lines are read by generating the resolution setting data and making the operational settings of the shift register 23, as described above, for each line based on the resolution setting data.

Resolution data is added to the end of each line of image data, by a resolution data addition device (not shown). The resolution data is generated by the resolution data addition device, based on the conditions of the latches 39, 41 in the resolution switching device 31. The resolution data corresponds to the resolution that is set for the reading of each line. When the resolution setting data associated with 1200 dpi is received by the resolution setting data generator 38 from the resolution switching device 31, all photoelectric converting elements 15 independently release the electric charge, and accordingly the image signal associated with 1200 dpi is generated.

The pattern of ON-OFF control for the analog switches 19 performed by the shift register 23 will be described below, when the resolution setting data associated with 600 dpi is generated. As described above, the selector switches 35 are connected to the terminal 1 thereof, so that every other (1st, 3rd, 5th . . . ) flip-flops 33 are connected. The selector switches 37 are connected to the terminal 1 thereof. Accordingly, the 1st flip-flop 33 is connected to the gates of the 1st and 2nd analog switches 19. Similarly, the 3rd flip-flop 33 is connected to the gates of the 3rd and 4th analog switches 19. That is, the (2n−1)-th flip-flop 33 is connected to the gates of the (2n−1)-th and 2n-th analog switches 19. The even-numbered flip-flops 33 are not connected to a gate of any analog switches 19.

As the SP signal is input to the first flip-flop 33, the first analog switch 19 is closed for a period of one cycle of the CLK signal. The second analog switch 19 is also closed for a period of one cycle of the CLK signal, due to the selector switch 37 connected to the terminal 1 thereof. Accordingly, an electric charge stored in the 1st and 2nd photoelectric converting elements 15 is sent to the AO terminal 21, substantially at the same time.

The SP signal input to the first flip-flop 33 is sequentially transmitted, through the selector switch 35 connected to the terminal 1 thereof, to the odd-numbered flip-flops 33, such as 3rd, 5th, . . . and the 10335th flip-flop 33, in synchronization with the CLK signal. The odd-numbered flip-flops 33 that receive the SP signal, close two analog switches 19 with the same number as the flip-flops 33 and its next number, for a period of one cycle of the CLK signal. Accordingly, every time the SP signal is transmitted to the odd-numbered flip-flops 33, electric charge stored in the photoelectric converting elements 15 with the same number as the flip-flops 33 and its next number is released to the AO terminal 21. The electric charge thus sent to the AO terminal 21 is transmitted, as an image signal, to the A/D converter 9 of the ASIC 5. As the 1st to 10336th photoelectric converting elements 15 release the electric charge, reading of the first line is finished. Thereafter, the 2nd and subsequent lines are read by generating the resolution setting data and making the operational settings of the shift register 23, as described above, for each line, based on the resolution setting data. The resolution data is added to the end of each line of the image data, by the resolution data addition device (not shown), similarly as described above.

When the resolution setting data associated with 600 dpi is received by the resolution setting data generator 38 from the resolution switching device 31, two photoelectric converting elements 15 release the electric charge substantially at the same time. Accordingly, the image signal associated with 600 dpi is generated.

The pattern of ON-OFF control for the analog switches 19 performed by the shift register 23 will be described below, when the resolution setting data associated with 400 dpi is generated.

As described above, the (3m−2)th flip-flops 33, such as the 1st, 4th, and 7th flip-flops 33, are sequentially connected due to the selector switches (not shown), where m is an integer of 1 to 3445. The (3m−2)-th flip-flops 33 are connected to the (3m−2)-th, (3m−1)-th, and 3m-th analog switches 19.

As the SP signal is input to the first flip-flop 33, the first to third analog switches 19 are closed for a period of one cycle of the CLK signal. Accordingly, an electric charge stored in the first to third photoelectric converting elements 15 is sent to the AO terminal 21.

The SP signal input to the first flip-flop 33 is sequentially transmitted to the (3m−2)-th flip-flops 33, such as the 4th and 7th flip-flops 33, in synchronization with the CLK signal. The (3m−2)-th flip-flops 33 that receive the SP signal close the (3m−2)-th, (3m−1)-th, and 3m-th analog switch 19 for a period of one cycle of the CLK signal. Every time the SP signal is transmitted to the (3m−2)-th flip-flops 33, an electric charge stored in the (3m−2)-th, (3m−1)-th, and 3m-th flip-flops 33 is released to the AO terminal 21. The electric charges sequentially sent to the AO terminal 21 is transmitted, as an image signal, to the A/D converter 9 of the ASIC 5. As the 1st to 10336th photoelectric converting elements 15 release the electric charge, reading of the first line is finished. Thereafter, the 2nd and subsequent lines are read by generating the resolution setting data and making the operational settings of the shift register 23, as described above, for each line, based on the resolution setting data. The resolution data is added to the end of each line of the image data, by the resolution data addition device (not shown), similarly as described above.

When the resolution setting data associated with 400 dpi is received by the resolution setting data generator 38 from the resolution switching device 31, three photoelectric converting elements 15 release the electric charge stored therein substantially at the same time. Accordingly, the image signal associated with 400 dpi is generated.

The pattern of ON-OFF control for the analog switches 19 performed by the shift register 23 will be described below, when the resolution setting data associated with 300 dpi is generated.

As described above, the (4L−3)th flip-flops 33, such as the 1st, 5th, and 9th flip-flops 33, are sequentially connected, due to the selector switches (not shown), where L is an integer of 1 to 2584. The (4L−3)th flip-flops 33 are connected to the (4L−3)th, (4L−2)-th, (4L−1)-th and 4L-th analog switches 19. As the SP signal is input to the first flip-flop 33, the first to fourth analog switches 19 are closed for a period of one cycle of the CLK signal. Accordingly, electric charge stored in the 1st through 4th photoelectric converting elements 15 is sent to the AO terminal 21.

The SP signal input to the first flip-flop 33 is sequentially transmitted to the (4L−3)th flip-flops 33, such as the 5th and 9th flip-flops 33, in synchronization with the CLK signal. The (4L−3)th flip-flops 33 that receive the SP signal, close the (4L−3)th, (4L−2)-th, (4L−1)-th and 4L-th analog switches 19 for a period of one cycle of the CLK signal. Accordingly, every time the SP signal is transmitted to the (4L−3)th flip-flops 33, electric charge stored in the (4L−3)th, (4L−2)-th, (4L−1)-th and 4L-th photoelectric converting elements 15 is released to the AO terminal 21. The electric charge thus sent to the AO terminal 21 is transmitted, as an image signal, to the A/D converter 9 of the ASIC 5. As the 1st to 10336th photoelectric converting elements 15 release the electric charge, reading of the first line is finished. Thereafter, the 2nd and subsequent lines are read by generating the resolution setting data and making the operational settings of the shift register 23, as described above, for each line, based on the resolution setting data. The resolution data is added to the end of each line of the image data, by the resolution data addition device (not shown), similarly as described above.

When the resolution setting data associated with 300 dpi is received by the resolution setting data generator 38 from the resolution switching device 31, four photoelectric converting elements 15 release the electric charge substantially at the same time. Accordingly, the image signal associated with 300 dpi is generated.

The generation of the resolution setting data may be performed once for one page of an image to be read. In this case, the operational settings for the shift register 23 may be made based on the same resolution setting data throughout the reading of one page.

The ASIC 5 determines whether an image data transmitted from the reading head 6 is read at the resolution set by the ASIC 5. More specifically, the resolution associated with the waveform generated by the wave generator 7 (resolution set by the ASIC 5) corresponds to the resolution data added to the image data.

If the image data sent from the reading head 6 is read at the resolution set by the ASIC 5, normal image processing is performed. If the image data from the reading head 6 is not read at the resolution set by the ASIC 5, a warning is issued or the image reading operation is stopped.

Effects brought by the image reading device 1, the reading head 6, and the resolution setting method according to the first embodiment will be described below.

Effect 1: Four resolutions of 1200 dpi, 600 dpi, 400 dpi, and 300 dpi may be selectable. The setting of the resolution may readily be made based on the three types of STB, SP, and CLK signals.

Effect 2: The start signal (SP signal) may set a period for designating a resolution in the first embodiment. The ON-OFF control for the shift register 23 may be started based on the falling edge of the SP signal. Therefore, the ON-OFF control for the shift register 23 may not be started, until the SP signal used for the resolution setting falls.

Effect 3: Resolution may be set for each line of an image to be read. In this case, the resolution setting and image reading of one line may be stored as a series of operations performed for one line. The series of the operations may be performed repeatedly for the image reading. Therefore, the controls of the image reading device 1 may be facilitated. Resolution of the image to be read may be set for every page. In this case, the setting of the resolution may be made once for each page, so that the number of resolution setting to be made may be reduced. Accordingly, the time required for the image reading may be reduced.

Effect 4: When a resolution other than the maximum resolution of 1200 dpi is set, the shift register 23 may turn on the plurality of the analog switches 19 substantially at the same time, according to the set resolution. Therefore, the electrical signals may be released from the plurality of the photoelectric converting elements 15 and sent to a signal line substantially at the same time. Even when an output of an electrical signal from one photoelectric converting element 15 is small due to the shortened cycle of receiving optical signals through outputting electric signals, a plurality of the photoelectric converting elements 15 may output the electric signals to a signal line substantially at the same time, if the resolution other than the maximum resolution of 1200 dpi, that is, a resolution of 600 dpi, 400 dpi, or 300 dpi is set. Therefore, the outputs of the electric signals to the signal line may not become small, so that a signal-to-noise (S/N) ratio of the read image may be maintained high.

Effect 5: Every time one line is read (every time resolution is set), the image signal contains a resolution signal indicative of a resolution. Therefore, the ASIC 5 may determine whether the resolution setting in the reading head 6 is appropriately made. When the resolution setting is inappropriately made, the image reading may be stopped or warning, such as messages, may be issued.

Figure 9:
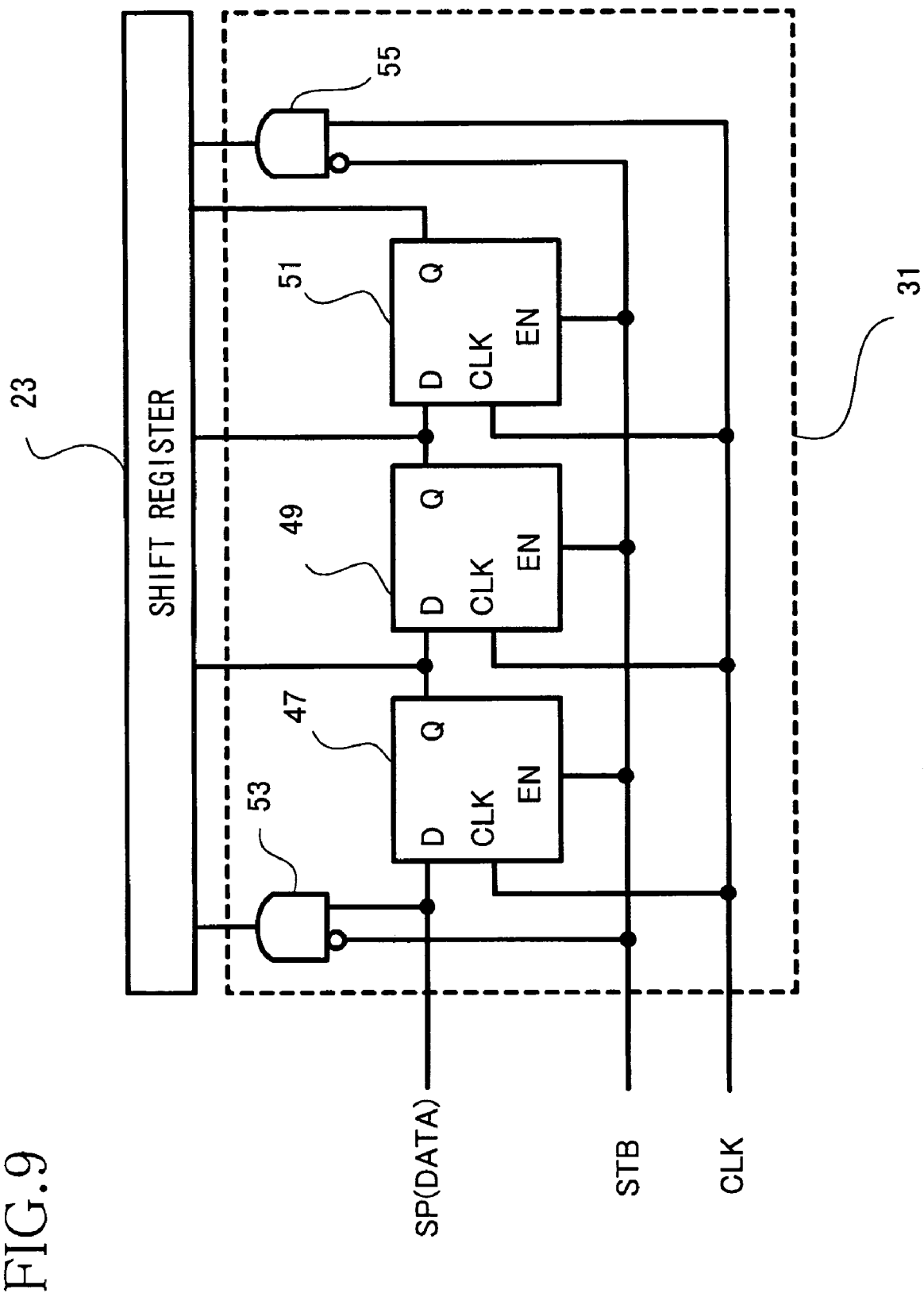
FIG. 9 is a circuit diagram showing a structure of a resolution switching device according to a second embodiment of the invention.

A second embodiment will be described below. It should be noted that like elements be labeled with like numbers. The image reading device 1 according to the second embodiment is basically the same as the image reading device 1 according to the first embodiment, except that the image reading device 1 according to the second embodiment includes three latches 47, 49, 51 in the resolution switching device 31, as shown in FIG. 9.

Figure 10:
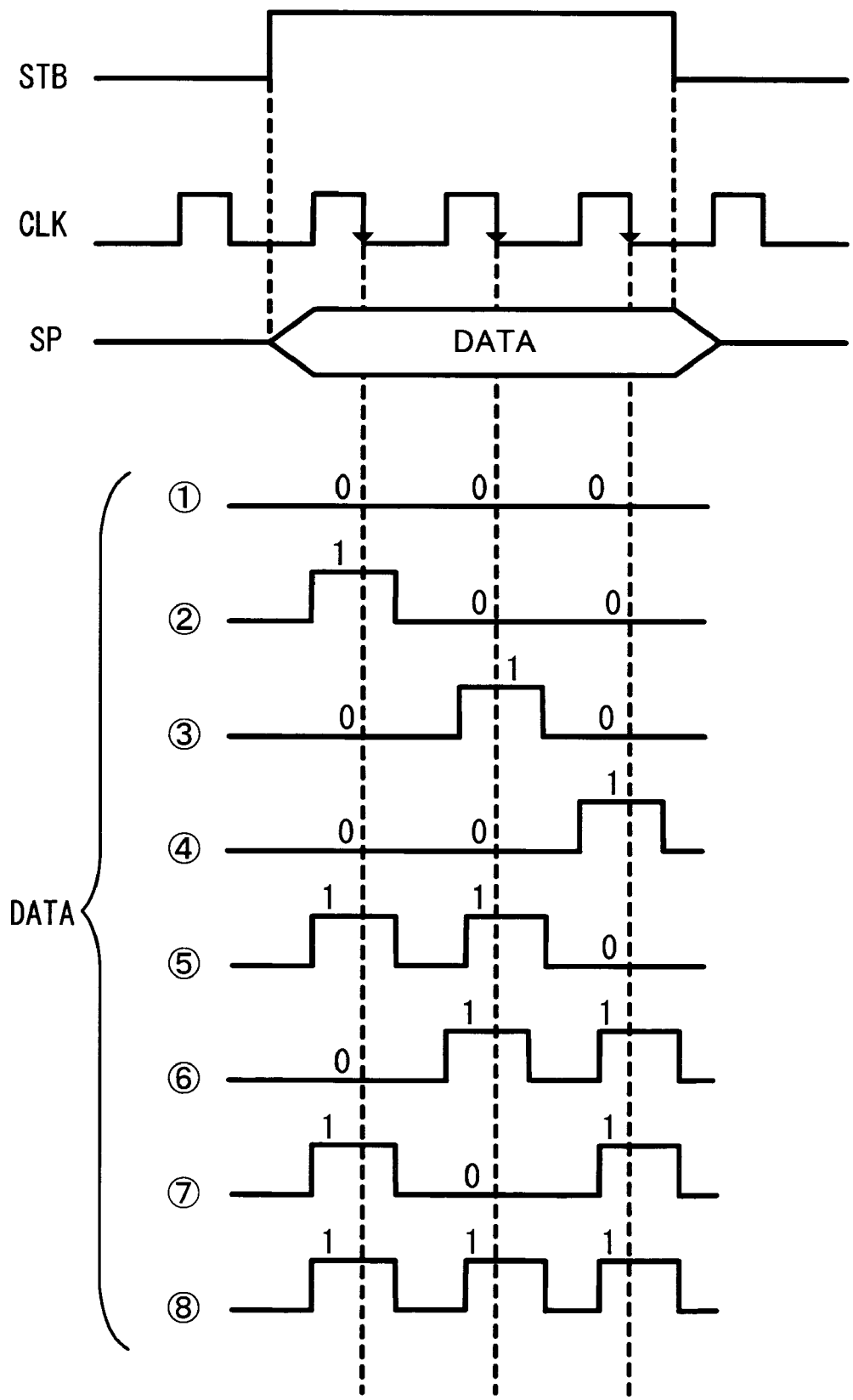
FIG. 10 is a schematic illustration showing waveforms of signals used for setting resolutions according to the invention.

In the second embodiment, the STB signal is for setting a period for designating a resolution. The CLK signal is for setting the timing for designating the resolution. The SP signal is for designating the resolution. As the STB, CLK, and SP signals shown in FIG. 10 are input from the wave generator 7 to the resolution switching device 31, the latch 47 latches DATA (output of the SP signal) at a timing of the first falling edge of the CLK signal, during the period that the STB signal is on, as binary data. More specifically, the latch 47 latches "1" if the SP signal is on at the timing of the first falling edge of the CLK signal, during the period that the STB signal is on. The latch 47 latches "0" if the SP signal is off at the timing of the first falling edge of the CLK signal, during the period that the STB signal is on. The latch 49 latches "1" and "0" if the SP signal is on and off, respectively, at the timing of the second falling edge of the CLK signal, during the period that the STB signal is on. The latch 51 latches "1" and "0" if the SP signal is on and off, respectively, at the timing of the third falling edge of the CLK signal, during the period that the STB signal is on.

The conditions of the latches 47, 49, 51 in the resolution switching device 31 are changed by changing a waveform of the SP signal generated by the wave generator 7, based on the instruction from the CPU 13. Combinations of the conditions of the latches 47, 49, 51 are shown in the table of FIG. 11.

The resolution setting data generator 38 generates eight types of resolution setting data, according to the 8 different conditions of the latches 47, 49, 51. Based on the resolution setting data, the patterns for ON-OFF control performed by the shift register 23 for the analog switches 19 are determined. Consequently, resolution for image reading by the image reading device 1 is determined.

The shift register 23 includes a selector switch (which correspond to the selector switch 35 in the first embodiment) that connects the flip-flops 33 with one or more the flip-flops 33 skipped, according to the resolution setting data of 8 types. The shift register 23 also includes a selector switch (which correspond to the selector switch 37 in the first embodiment) that closes the plurality of the analog switches 19 with respect to one flip-flop 33, according to the resolution setting data.

The image reading device 1 according to the second embodiment, sets the resolution setting data from 8 types, based on the three types of SP, CLK, and STB signals that the wave generator 7 generates. Based on the set resolution setting data, the pattern of ON-OFF control performed by the shift register 23 for the analog switches 19 is determined. Thus, the resolution for the image reading device 1 is determined from the 8 types.

As shown in FIG. 9, the resolution switching device 31 according to the second embodiment includes switches 53, 55. The switch 53 does not allow the input of the SP signal to the shift register 23, until the STB signal falls. The switch 55 does not allow the input of the CLK signal to the shift register 23 until the STB signal falls.

In the image reading device 1 according to the second embodiment, with the switch 53, the shift register 23 is not activated by the SP signal used as the resolution setting signal before the STB signal falls. Accordingly, even when the timing that the SP signal, which is used as the resolution setting signal in the second embodiment, is turned on is varied or shifted, the SP signal does not activate the shift register 23. Therefore, a start timing of the image reading is not off. Further, the shift register 23 is not activated before the resolution is set.

In the second embodiment, the SP signal is again input to the resolution switching device 31, after the falling edge of the STB signal. At this time, as the STB signal has already fallen, the SP signal is input to the shift register 23 through the switch 53, to activate the shift register 23.

For the image reading device 1 according to the second embodiment, similar effects to the above-described Effects 1, 3, 4 and 5 of the first embodiment will be brought about.

While the invention has been described with reference to the embodiments, it is to be understood that the invention is not restricted to the particular forms shown in the foregoing embodiments. Various modifications and alterations can be made thereto without departing from the scope of the invention, as set forth in the appended claims.

For example, for the resolution setting according to the second embodiment, the SP, STB, and CLK signals may be interchanged. More specifically, the STB signal may be used as a signal for setting a period for designating a resolution. The SP signal may be used as a signal for setting the timing for designating the resolution. The CLK signal may be used as a signal for designating the resolution.

The CLK signal may be used as a signal for setting a period for designating a resolution. In this case, one of the STB and SP signals may be used as a signal for setting the timing for designating the resolution. The other one of the STB and SP signals may be used as a signal for designating the resolution.

Further, the SP signal may be used as a signal for setting a period for designating a resolution. In this case, one of the STB and CLK signals may be used as a signal for setting the timing for designating the resolution. The other one of the STB and CLK signals may be used as a signal for designating the resolution.

When the SP signal is used as a signal for setting the timing for designating a resolution or for designating a resolution, it is preferably that the switch 53 be provided to prevent the SP signal from being input before the signal for setting a period for designating a resolution falls.

In the second embodiment, the output of the SP signal may be latched at the rising edge of the CLK signal during the STB signal is on.

The switch 53 may be structured such that the SP signal is not input to the shift register 23 during a predetermined period of time from the falling or rising edge of the STB signal.

What is claimed is:

1. An image sensor, comprising:
a plurality of photoelectric converting elements that convert an optical signal to an electric signal, each of the photoelectric converting elements being provided with an electric charge output port;
a common signal line that is connected to the electric charge output port of each of the photoelectric converting elements;
a group of channel selection switches that are disposed between the common signal line and each of the photoelectric converting elements and that turns on and off between the electric charge output port and the common signal line;
a resolution switching device that inputs a first signal, a second signal, and a third signal, that further reads an on-off pattern of the third signal by sampling whether the third signal is high or low, when the first signal is on, at a timing of a rising or falling edge of the second signal, and that sill further outputs a resolution switching signal according to the on-off pattern of the third signal; and
a control signal generator that determines an ON-OFF control pattern of the group of channel selection switches, based on the resolution switching signal, and supplies a drive signal to the group of the channel selection switches, based on the determined ON-OFF control pattern.

2. The image sensor according to claim 1, wherein the control signal generator is a shift register group including flip-flops provided in association with the group of channel selection switches and a selector switch that switches operation timings of the flip-flops, and the ON-OFF control pattern of the group of channel selection switches is determined by setting the selector switch based on the resolution switching signal output from the resolution switching device.

3. The image sensor according to claim 2, wherein when a resolution other than a maximum resolution is set, the shift register group turns on at least two of the plurality of the channel selection switches on at substantially the same time, according to the set resolution.

4. The image sensor according to claim 1, wherein an on and off of the third signal at the timing of the rising or falling edge of the second signal is expressed as binary data and the resolution switching signal is output based on the binary data.

5. The image sensor according to claim 1, wherein the first signal, the second signal, and the third signal are any of a control signal for setting the resolution, a start signal for starting the shift register group, and a clock pulse signal that are input from an external device.

6. The image sensor according to claim 5, wherein when one of the second signal and the third signal is the start signal, the start signal does not start the shift register group for a predetermined period of time from the rising or falling edge of the first signal.

7. The image sensor according to claim 5, wherein when the first signal is the start signal, an on-off control for the shift register group is started based on the falling edge of the first signal.

8. The image sensor according to claim 5, wherein the second signal is the clock pulse signal.

9. The image sensor according to claim 5, wherein at least four resolutions are selectable based on the three signals.

10. The image sensor according to claim 1, wherein the resolution switching signal is output for every line of an image to be read.

11. The image sensor according to claim 1, wherein the resolution switching signal is output for every page of an image to be read.

12. The image sensor according to claim 1, wherein the image sensor outputs a signal including a resolution signal indicative of the resolution.

13. The image sensor according to claim 1, wherein when a resolution signal indicative of a resolution indicates an inappropriate resolution, image reading is stopped.

14. An image reading device, comprising:
   a supply portion that supplies sheets;
   a reading head that reads the supplied sheets, wherein the reading head includes the image sensor of claim 1; and
   a discharge portion that receives the sheet that has been read by the reading device.

15. A method of reading an image with an image sensor comprising a plurality of photoelectric converting elements that convert an optical signal to an electric signal, each of the photoelectric converting elements being provided with an electric charge output port, a common signal line that is connected to the electric charge output port of each of the photoelectric converting elements, a group of channel selection switches that are disposed between the common signal line and each of the photoelectric converting elements and that turns on and off between the electric charge output port and the common signal line, comprising:
   inputting a first signal, a second signal, and a third signal;
   reading an on-off pattern of the third signal by sampling whether the third signal is high or low, when the first signal is on, at a timing of a rising or falling edge of the second signal;
   outputting a resolution switching signal according to the on-off pattern read by the step of reading;
   determining an ON-OFF control pattern of the group of channel selection switches, based on the outputted resolution switching signal; and
   supplying a drive signal to the group of channel selection switches, based on the determined ON-OFF control pattern.

16. The method of claim 15, wherein the first signal, the second signal, and the third signal are any of a control signal for setting the resolution, a start signal for starting the shift register group, and a clock pulse signal that are input from an external device.

17. The method of claim 15, wherein the resolution switching signal is output with a shift register group including flip-flops provided in association with the group of channel selection switches and a selector switch that switches operation timings of the flip-flops, and the ON-OFF control pattern of the group of channel selection switches is determined by setting the selector switch based on the output resolution switching signal.

18. The method of claim 17, wherein when a resolution other than a maximum resolution is set, the shift register group turns on at least two of the plurality of the channel selection switches on at substantially the same time, according to the set resolution.

* * * * *